US011405373B2

(12) United States Patent
McMurdie et al.

(10) Patent No.: US 11,405,373 B2
(45) Date of Patent: Aug. 2, 2022

(54) BLOCKCHAIN-BASED SECURED MULTICAST COMMUNICATIONS

(71) Applicant: HONEYWELL INTERNATIONAL INC., Morris Plains, NJ (US)

(72) Inventors: Kevin McMurdie, Surprise, AZ (US); Brian Polcyn, Phoenix, AZ (US); Ganesh P. Gadhe, Phoenix, AZ (US)

(73) Assignee: Honeywell International, Inc., Morris Plains, NJ (US)

( * ) Notice: Subject to any disclaimer, the term of this patent is extended or adjusted under 35 U.S.C. 154(b) by 401 days.

(21) Appl. No.: 16/534,590

(22) Filed: Aug. 7, 2019

(65) Prior Publication Data

US 2020/0084194 A1 Mar. 12, 2020

Related U.S. Application Data

(60) Provisional application No. 62/728,360, filed on Sep. 7, 2018.

(51) Int. Cl.

| | |
|---|---|
| ***H04L 29/06*** | (2006.01) |
| ***H04L 12/18*** | (2006.01) |
| ***H04L 9/08*** | (2006.01) |
| ***G06Q 20/38*** | (2012.01) |
| ***H04L 9/40*** | (2022.01) |

(52) U.S. Cl.

CPC ......... *H04L 63/065* (2013.01); *G06Q 20/382* (2013.01); *H04L 9/0825* (2013.01); *H04L 12/185* (2013.01); *H04L 2209/38* (2013.01)

(58) Field of Classification Search

CPC ... H04L 63/065; H04L 9/0825; H04L 12/185; H04L 2209/38; G06Q 20/382

See application file for complete search history.

(56) References Cited

U.S. PATENT DOCUMENTS

| | | | | |
|---|---|---|---|---|
| 9,992,028 | B2 * | 6/2018 | Androulaki | H04L 9/3247 |
| 2009/0063471 | A1 * | 3/2009 | Erickson | G06F 16/24578 707/999.005 |
| 2016/0261482 | A1 * | 9/2016 | Mixer | H04L 43/12 |
| 2017/0031874 | A1 * | 2/2017 | Boudville | H04L 9/3239 |

(Continued)

FOREIGN PATENT DOCUMENTS

| | | | | |
|---|---|---|---|---|
| EP | 3419210 | A1 * | 12/2018 | H04L 9/006 |
| WO | 2016161073 | | 10/2016 | |

(Continued)

*Primary Examiner* — Darshan I Dhruv

(74) *Attorney, Agent, or Firm* — John Maldjian; Stevens & Lee PC

(57) ABSTRACT

A blockchain-based network arrangement includes member nodes joined by a multicast network including a trusted node configured for creating at least one cryptographic key and for distributing copies of the cryptographic key over the multicast network as a multicast blockchain transmission to other member nodes. A requesting node outside the member nodes is configured for initiating a smart contract containing its blockchain address and for sending the smart contract as a request for group access with an address of the trusted node. The trusted node is configured for receiving the smart contract and a decides to accept or reject the smart contract, and records the decision in the blockchain by updating the smart contract. An accept decision results in a member node sending the cryptographic key to the requesting node.

17 Claims, 3 Drawing Sheets

Method 200

Creating at least one cryptographic key at a knowntrusted node in a multicast network including a plurality of member nodes — Step 201

The trusted node distributing copies of the cryptographic key over the multicast network as a multicast blockchain transmission to the plurality of nodes — Step 202

A requesting node from outside the plurality of member nodes initiating a smart contract containing it's blockchain address, and then sending smart contract as a request for access with an address of the trusted node over the multicast network — Step 203

The trusted node receiving the smart contract and making a decision whether an accept decision to accept the smart contract or a reject decision to reject the smart contract — Step 204

Recording the decision in the blockchain including by updating the smart contract — Step 205

An accept decision resulting in one of the plurality of member nodes sending the cryptographic key over the multicast network to the requesting node to enable the requesting node to participate in secure communications in the multicast network — Step 206

(56) References Cited

U.S. PATENT DOCUMENTS

2017/0177855 A1 6/2017 Costa Faidella et al.
2017/0352027 A1 12/2017 Zhang et al.
2018/0097638 A1* 4/2018 Haldenby ........... H04W 12/041
2018/0114205 A1 4/2018 Thomas et al.
2018/0227275 A1* 8/2018 Russinovich ........... G06F 21/74
2019/0058577 A1* 2/2019 Bowman ................. H04L 9/085
2019/0347656 A1* 11/2019 Lu .................... G06Q 20/38215
2020/0007315 A1* 1/2020 Vouk ..................... H04L 9/0637

FOREIGN PATENT DOCUMENTS

WO 2017098519 6/2017
WO 2018058105 3/2018
WO WO-2019130051 A1 * 7/2019 ........... H04L 12/185
WO WO-2019135734 A1 * 7/2019 ......... G06F 21/6209

* cited by examiner

BLOCKCHAIN-BASED SECURED MULTICAST COMMUNICATIONS

CROSS REFERENCE TO RELATED APPLICATIONS

This application claims the benefit of Provisional Application Ser. No. 62/728,360 entitled “BLOCKCHAIN-BASED SECURED MULTICAST PLANT COMMUNICATIONS”, filed Sep. 7, 2018, which is herein incorporated by reference in its entirety.

FIELD

Disclosed embodiments relate to multicast group communications for process control systems, such as those in industrial plants.

BACKGROUND

In computer networking, multicast is group communications where data transmission is simultaneously addressed to a group of destination devices generally including computers. Multicast communications can be a one-to-many computer or can be many computer-to-many computer.

Conventional options are limited for encrypting and/or securing multicast traffic. The standard for secure multicast communications generally requires a server to distribute and manage policies and the keys necessary for encrypting and decrypting the multicast traffic to all participating network parties (or nodes) for secure multicast network communications.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize conventional server-based multicast group communication networks, such as for communications in an industrial processing facility (IPF), also known as a ‘plant’ that runs an industrial process, which depend on a server to distribute and manage policies and keys necessary for encrypting and decrypting multicast traffic represent a single point of network failure. Moreover, this conventional multicast communications arrangement has a high overhead. Through blockchain technology, this Disclosure describes modifying this architecture such that the conventional server previously required for distributing and managing keys and policies for secure multicast communications is replaced by using private blockchains that are used on all member nodes.

Through this disclosed blockchain-based approach, the distributed nature of the blockchain implementation reduces the dependence on a server which is a single point of failure, and reduces the overhead of the implementation by removing the need for a server to distribute and manage keys and policies to the network nodes. Each participating network node is responsible for facilitating requests for group access through the use of smart contracts to enable an operator (a manual method), or through the use of a certificate (software-based method) to make a determination on whether or not a requesting node should be allowed to join the multicast group.

A blockchain is known to be a distributed ledger, analogous to a distributed database that comprises a continuously growing list of records, called ‘blocks’, which are linked and secured using cryptography, where each block typically contains a hash pointer (that is a data structure providing a pointer to the place where some information is stored) as a link to a previous block, a timestamp, and data. A private blockchain (PB) as used herein is a blockchain operated by an organization within a closed (non-public) communications network.

Disclosed aspects include a blockchain-based network arrangement that includes a plurality of member nodes communicably joined by a multicast network including a known trusted node. The trusted node is configured for creating at least one cryptographic key and for distributing copies of the cryptographic key over a multicast network as a multicast blockchain transmission to other member nodes. A requesting node that is outside the member nodes is configured for initiating a smart contract containing a blockchain address of the requesting node and is configured for sending the smart contract over the multicast network as a request for group access with an address of the trusted node. The trusted node is configured for receiving the smart contract and decides whether to accept the smart contract or reject the smart contract, and records the decision in the blockchain including by updating the smart contract. An accept decision results in one of the member nodes (e.g., the trusted node) sending the cryptographic key to the requesting node.

DETAILED DESCRIPTION

Figure 1:
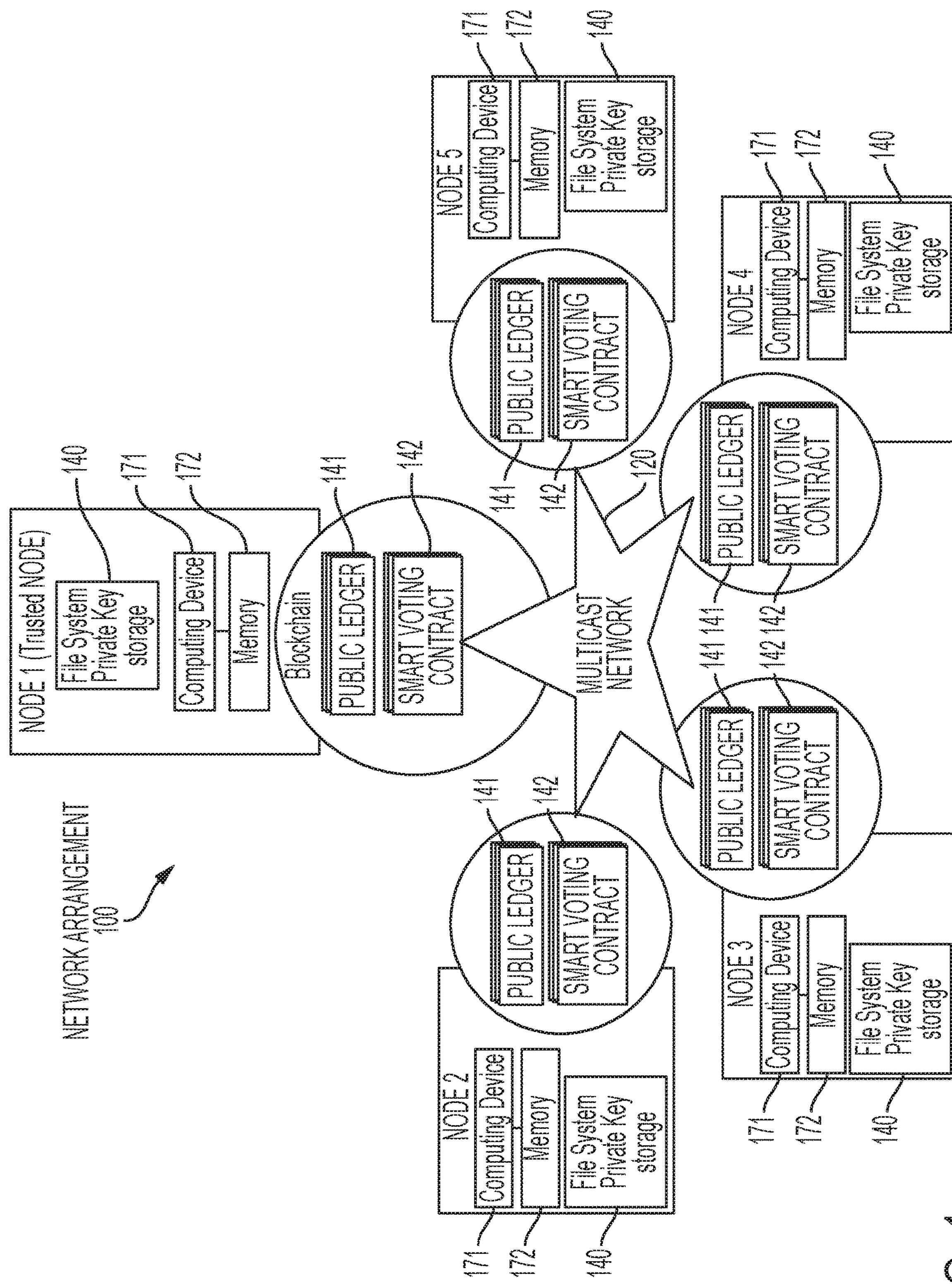
FIG. 1 shows nodes of an example blockchain-based multicast network arrangement in simplified form with network participants shown as participant nodes 1 to 5, where the multicast network implements a disclosed PB and smart contracts to enable secure multicast symmetric key distribution.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

As noted above, this Disclosure describes a PB and smart contracts for a secure multicast solution which replaces a conventional server and conventional certificate-based trust for a multicast network, such as for a process control network. Although generally described herein for plant process control network communications or process control systems in an IPF configured to run an industrial process that involves a tangible product, disclosed PB's with smart contracts can allow any communications network (including wired or wireless networks) associated with generally any system. For example, Supervisory Control and Data Acquisition (SCADA) systems, input/output (IO) networks, management, or IT networks are some examples that can host a blockchain data structure for its network communications to securely manage enrollment and distribution of cryptographic keys, and can also securely manage its network communications by providing select cryptographic keys to select hosts to enable the creation of multicast communities. Different key and host combinations can be selected to support 0 to n multicast communities comprised of hosts participating in 0 to n of the communities.

A smart contract as known in blockchains is a software program that adds layers of information onto digital transactions being executed on a blockchain that allows for more complex transactions than simply exchanging digital tokens for a product or service. A smart contract between two or more nodes backed by a blockchain acts as a decentralized and immutable ledger. The smart contract between the nodes can execute actions and/or enforce policies that thus cannot be compromised without a discrepancy occurring in the ledgers that are hosted at each node. In this Disclosure the ledger is the blockchain which is distributed such that the conventional need for a server to centrally manage communication functions in the multicast network is not necessary. Once a disclosed smart contract is negotiated, the smart contract backed by blockchain technology provides an immutable record and a way to enforce adherence.

Using Ethereum as an example blockchain technology and adopting their design constraints, smart contracts can be executed in the "Ethereum Virtual Machine" (EVM). The EVM is the runtime environment for smart contracts in Ethereum that is not only sandboxed but is actually completely isolated meaning that code running inside the EVM has no access to network, filesystem, or other processes. Smart contracts even have limited access to other smart contracts. This information is included herein to highlight the feature that smart contracts themselves do not introduce additional attack vectors into a network. This property provides an additional layer of protection for disclosed blockchain-based multicast communications implementation.

In this Disclosure, smart contracts are used to establish trust by an enforcing participant node known as a "trusted node". Utilizing a smart contract is a mechanism to create and establish trust relationships either a designated trusted node, or any participating node in the multicast network can be designated as a trusted node to prompt untrusted nodes to participate in a smart contract with the intent of establishing trust.

Using any blockchain technology that supports smart contracts, and blockchain technology such as Ethereum, trust for nodes can be established and enforced. The process described below goes through an initial deployment of a blockchain of trust and details a trust relationship being established. In this Disclosure a blockchain is used by software and networking solutions at the network nodes in place of conventional public key infrastructure (PKI) systems to determine trust for any node in a multicast network.

A network specific blockchain instance is first created on a known trusted node. In this instance, if retrofitting an existing installation, one can deploy a disclosed PB-based multicast solution on the computing base at the known trusted node which can host and is a member to the group which requires the use of this Disclosure for implementing a secure multicast solution. A network that uses multicast and would like to implement additional security features such as communication encryption and offer the ability to manage participation in a secure multicast group can benefit from a disclosed secure PB-based multicast solution.

The type of node that can be a trusted node to host the initial blockchain is any computing device that can host the solution that is created, typically based on an x86 architecture computer (a binary compatibility with the 32-bit instruction set of the 80386 CPU) running WINDOWS. This will create the genesis (initial) block for the chain and the trusted node will function as the chains' "server." This trusted node will generate at least one cryptographic key. In one embodiment the cryptographic key comprises a keypair comprising one private key and one public key. The private key should remain private and will be encrypted if using standard deployment practices. The public key will be used by the other nodes in the network to ask for permission to be trusted for secure network communications activities.

Once a node is deemed trusted, generally any multicast traffic is permitted, or it can be that the multicast traffic is restricted unless authorization has been granted by the trusted node serving as owner of the blockchain through a smart contract. The smart contract allows for more finite control of the type of permitted multicast. This provides a mechanism to complete a smart contract and authorize a node to participate in secure multicast communication with a group of similarly authorized nodes.

For each network node that requires trust to participate in disclosed PB-based multicast network communications such as, but not limited to, the industrial process run by processing equipment in the IPF:

1. A copy of all blocks of the existing blockchain (including the genesis block including the address of the designated trusted node and the public key in the case of a keypair) will be received by the requesting node once the requesting node is added as a peer. The trusted node can provide the copy of the existing blockchain. However, depending on the network topology and blockchain implementation, another solution is where when joining a blockchain the members of the blockchain will distribute their copy of the existing blockchain, so a copy of the existing blockchain can be sent to the requesting node by a peer node and not by a trusted node.

2. The requesting node will initiate a smart contract and send the request with the address of trusted node. This smart contract will contain the public key of the requester for the server to review.
3. The "server" will be alerted. There are a couple of different ways to provide an alert. One can alert on creation of a smart contract as each block gets pushed onto the blockchain. If in a disclosed solution one designates a particular node as a trusted node, the trusted node can host specialized software to respond to new entries on the chain such as smart contract entries that govern trust relations, that can decide to accept or reject the smart contract received.

Once the trusted node responds to the smart contract posited by the requesting node the trust relationship result (accepting or rejecting the relationship request) will be recorded in the blockchain acknowledging the results of the smart contract. The result from the trusted node's decision regardless of whether the relationship request is accepted or rejected will thus be recorded by the trusted node. The smart contract when pushed to a new node will be pushed onto the PB, and this will in turn propagate throughout each nodes' copy of the PB. A positive affirmation will enable the requesting node to participate in secure communications, whereas a negative response to the requesting node can be used to generate multicast alerts that an unexpected request for trust was solicited.

This process will be used to support query operations when software or network applications need to determine trust before initiating communication with a node. Each trust block on the PB will generally contain a reference to prior trust blocks in order to support query operations when an outside application needs to determine if a node is trustworthy. This feature is essentially using the bitcoin wallet method in calculating balances in which all transactions have references to previous outputs which are used to calculate balances by executing the history of the transactions.

The PB will also facilitate secure communication between nodes by allowing the software to query the blockchain to determine if the hosts' public address is recorded as being trustworthy. A "host" is any other participating computing node to include any computing device that can host the PB and participate in the creation of new blocks and implement standard blockchain functionality such as replication and receiving pushed blocks. If the node can host the blockchain and accommodate additional software that queries the chain for permissions, then the node is a candidate host for a Disclosed solution. This can mitigate impersonation attacks while removing dependency on an external third party for validation. For example, if node A wishes to securely communicate with node B, then node A can query its chain to determine if node B has been deemed trustworthy by examining the output of a secure contract if one exists. In this example, the smart contract would record each nodes' address, and this would be the basis for querying the PB to identify if a node is to be trusted.

Regarding realization, the example Ethereum platform was leveraged extensively when evaluating the limitations of operations within smart contracts, as well as evaluating how they operated. The Ethereum platform supports creating local instances of blockchains with all of the operations necessary to realize a disclosed solution. Smart contracts on Ethereum leverage the Solidity programming language which can be used to build all smart contracts discussed above as they are supported in the Ethereum blockchain environment. A proof of concept was created using Solidity and leveraged many of the elements that exist in a common currency exchange.

FIG. 1 shows nodes of an example multicast network arrangement 100 in simplified form with the participants shown as participant nodes 1 to 5, where the multicast network arrangement 100 includes a multicast network 120 that implements a disclosed PB and smart contracts to enable secure multicast symmetric cryptographic key distribution. All participant nodes include a computing device 171 comprising a processor having an associated memory 172.

Participant node 1 is shown as being the network manager shown as the trusted node. Each participant node has a file system in a suitable memory associated with a computing device having a processor, where the file system 140 that can be implemented in the associated memory 172 or another memory that includes private key storage (thus local key storage), as well as the public ledger 141 and a smart voting contract 142. Symmetrical key distribution is a likely technology to be used, where the keys in symmetric key distribution or distributed to all participants are identical, which allows a simplified cryptographic computation. This is beneficial to embedded devices especially where processing power may be limited.

Asymmetrical key distribution is also included herein, although this complicates the cryptographic computation and key distribution in some ways. Key distribution is performed over the multicast network 120 with the use of smart contracts.

The PB public ledger stored by all participant nodes contains all transactions since genesis of the multicast network which identifies participant devices currently permitted for secure communication, such as Ethernet communications. There can be a mechanism(s) to refresh the PB to prevent the file size from becoming too large. For example, a technique known as sharding, where individual nodes need not keep the complete blockchain. The symmetrical key and ledger mechanism allows for secure multicast communication. Blockchain transactions are shown reaching all network participant nodes.

The trusted node in the network is the first node which receives a disclosed installation package. A disclosed installation package can be implemented in firmware. However, standard software on top of a platform such as WINDOWS/UNIX/LINUX may also be used to implement disclosed functionality. The trusted node will generally instantiate the PB.

The other nodes in the network will receive a software package that allows these other network nodes to query a node which already possesses a copy of the PB to allow it to download a copy of the PB. This copy of the PB in turn provides the node(s) with the information used to spur the creation of a smart contract for authorization purposes.

Figure 2:
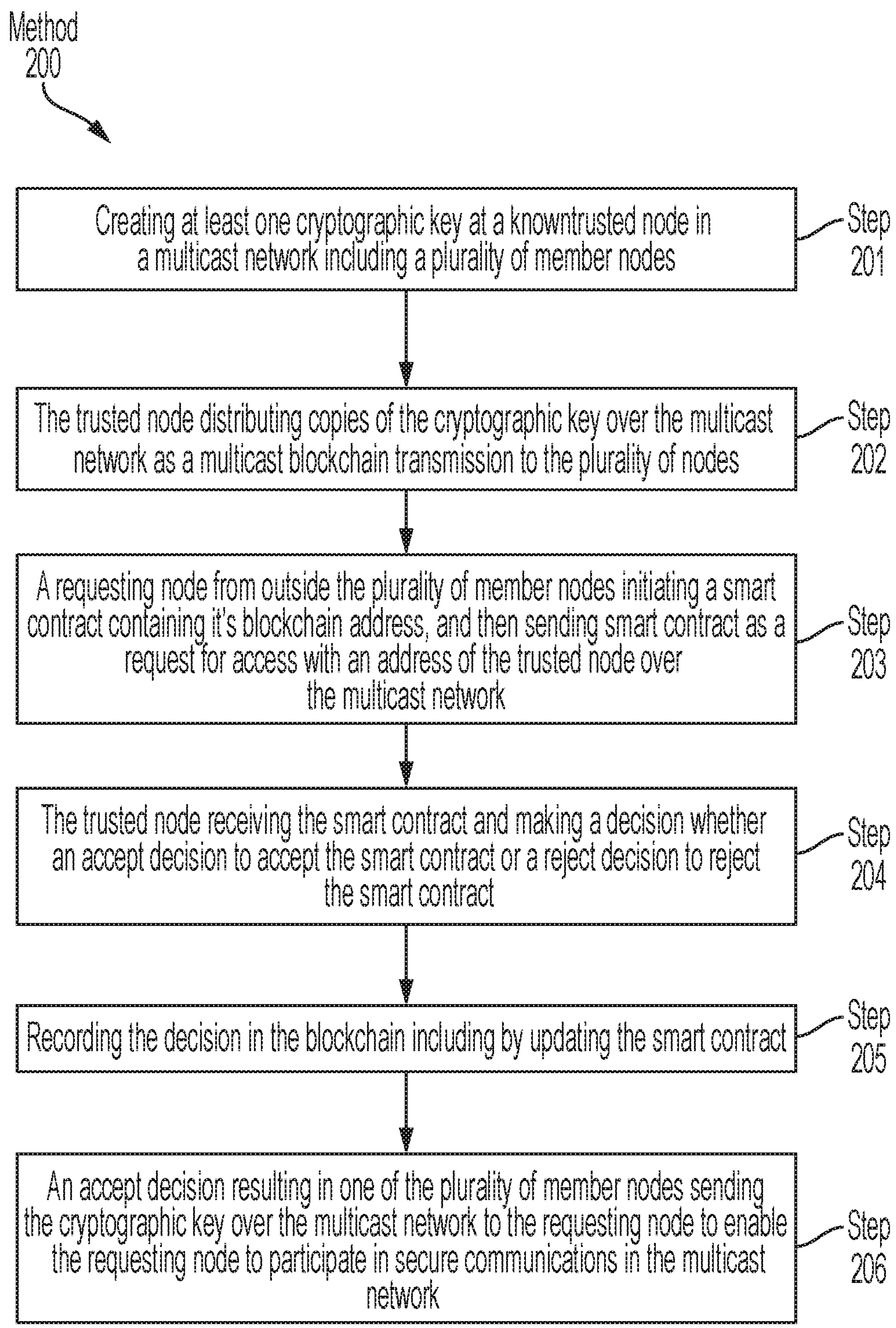
FIG. 2 is a flow chart that shows steps in a method of using a PB and smart contracts that replace a conventional server and conventional certificate-based trust in a multicast network, according to an example embodiment.

FIG. 2 is a flow chart that shows steps in a method 200 of using a PB and smart contracts to replace conventional servers and conventional certificate-based trust in a multicast network, according to an example embodiment. The network includes a plurality of member nodes communicably joined in a multicast network, such as shown in FIG. 1. The multicast network for method 200 can be a wired network (e.g., Ethernet) or a wireless network as long as the network supports the protocols used for method 200. If the communication medium cannot support either multicast or Transmission Control Protocol/Internet Protocol (TCP/IP), then the solution is generally tailored for a protocol that the medium supports.

Step 201 comprises creating at least one cryptographic key at a known trusted node in the multicast network. The cryptographic key can support symmetric-key algorithms. The cryptographic key can also support asymmetric key algorithms that comprise a keypair including a public key and a private key.

A cryptographic key such as a keypair can be created by using either a standard cryptographic library to generate the cryptographic key(s) or by leveraging an external keygen source such as a Trusted Platform Module (TPM). Step 202 comprises the trusted node distributing copies of the cryptographic key, being the public key in the case of the keypair, over the network as a multicast blockchain transmission to the plurality of nodes. Step 203 comprises a requesting node from outside the plurality of member nodes initiating a smart contract containing its blockchain address and sending the smart contract as a request for group access with an address of the trusted node over the multicast network.

The initial exchange does not need to be encrypted, because transmission of the blockchain is not sensitive as manipulation of the data in transit or the forging of new blocks would be detected once hashes are computed on newly distributed blocks. The intent is for the trusted node to gather identifying information about a requesting node to be able to use that to identify the requesting node within the smart contract which in turn is used for querying when determining if the requesting node has been trusted through the output of a smart contract containing it's identifying information which is implementation specific, but can be as little or as much information that gives confidence in the trust relationship. The identifying information can be the IP address of the requesting node along with its hostname, media access control (MAC) address, and the use of a private key either shared by each node in the network or unique to each node which allows each node to trust the origin of network communications.

Step 204 comprises the trusted node receiving the smart contract and making a decision whether to make an accept decision to accept the smart contract or a reject decision to reject the smart contract. Both manual and automatic decisions can be implemented to do so. Either manual determination can be made that a requesting node can be trusted or satisfying condition(s) exist to evidence trust of a requesting node if an automated decision approach is used. The node can be verified by an outside mechanism that is known to the trusted node. An example of this would be a node already verified via an Internet Engineering Task Force (IETF) standard for data authentication and encryption. TLS is another IETF standard cryptographic protocol.

After verifying the node the node would be able to participate in a configured multicast community. This would be an implementation determination that would be made each time for a specific deployment environment. Manual decisions may be more desirable from a security perspective. This is because in control systems (or other systems) where nodes are not commonly added and removed the overhead for making manual decisions would be limited. By having manual decisions each node is evaluated on a case-by-case basis and the exploitation of automatic mechanisms that may introduce vulnerabilities through complicated logic is eliminated.

An accept decision results in recording the requesting node's public address in the blockchain as being trustworthy. Step 205 comprises recording the decision in the blockchain by updating the smart contract. The smart contract when created will exist on the blockchain and each member node will have a copy of the blockchain that includes the smart contract and the result from that smart contract. Accordingly, the result from the actions described by the smart contract could be success or some other desired information from the executing node. Once recorded as an affirmative decision with an update to the smart contract this acts as authorization for the requesting node to participate in secure network communications with a select group being the group of authorized member nodes comprising those nodes allowed to participate in the multicast community.

Step 206 comprises the accept decision resulting in one of the plurality of member nodes sending the cryptographic key to the requesting node to enable the requesting node to participate in secure communications in the multicast network. Once a trust relationship for the requesting node has been recorded in the blockchain, this updated blockchain can be used by all member nodes to read to determine a member list, and this member list can restrict access in a plurality of ways such as sharing an encryption key over a direct channel (Hypertext Transfer Protocol Secure (HTTPS) to each member node. When a member node leaves this group the node such as in the case of decommissioning for example, or is no longer trusted such as in the case of expired cryptographic keys that have not been updated as an example, perhaps due to a maintenance issue. a new cryptographic key would be generated (by the trusted node and distributed securely as described above.

One application for disclosed blockchain-based secured multicast communications was for industrial process control and automation systems, including distributed control systems (DCSs), which are often used to automate large and complex industrial processes. These types of systems routinely include sensors, actuators, and controllers. The controllers typically receive measurements from the sensors and generate control signals for the actuators.

The Purdue model is commonly used to characterize an Industrial Control System (ICS) within an industrial processing facility (IPF). The Purdue model generally contains five levels, labeled zero (the bottom field level) through four (the top production scheduling level).

Figure 3:
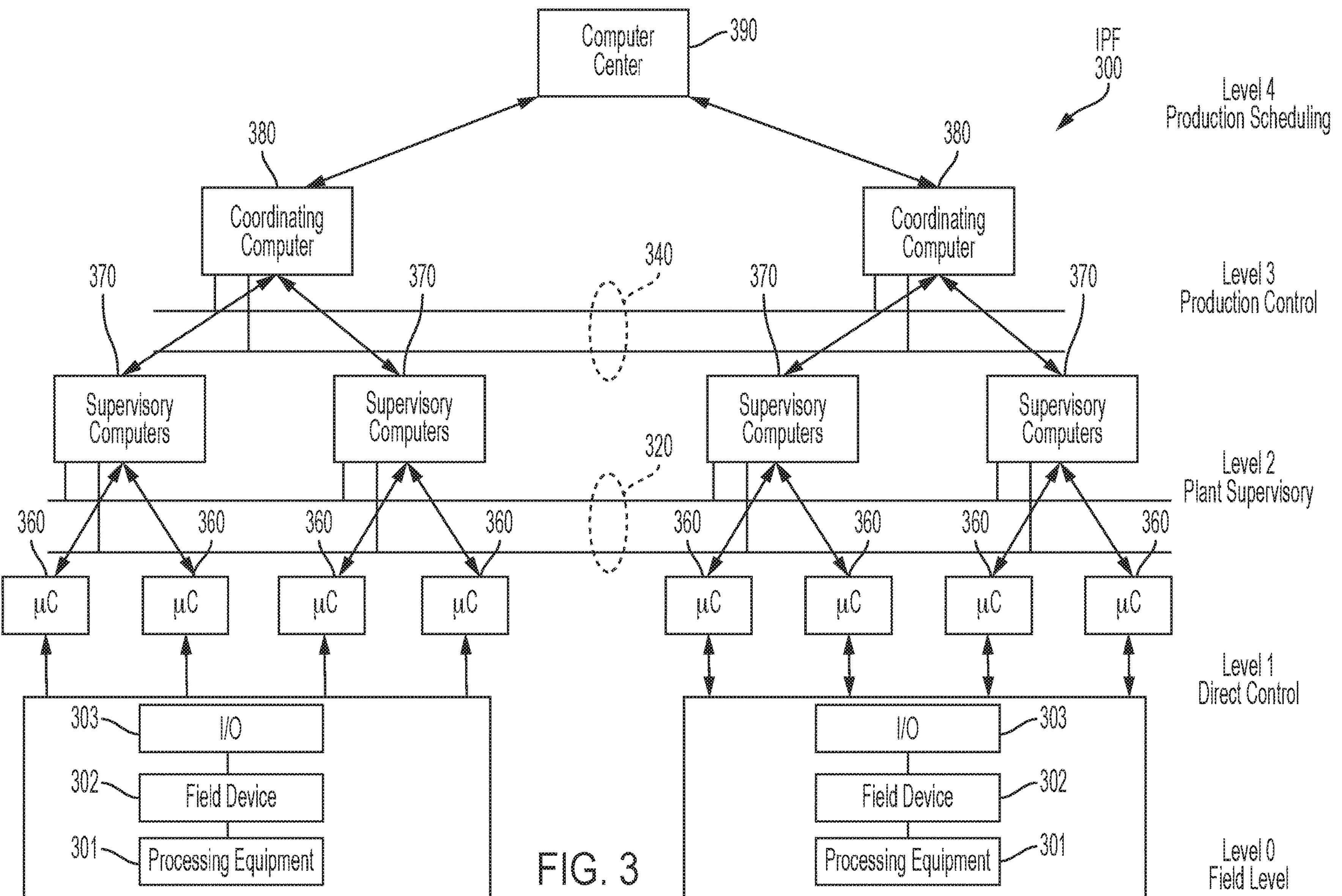
FIG. 3 shows an IPF displayed having 5 Purdue model levels that implements disclosed PB-based secured multicast communications involving at least one of its levels.

FIG. 3 shows an IPF 300 displayed having 5 Purdue model levels (0 to 4) that implements disclosed PB-based secured multicast communications involving at least one of its levels. Level 4 includes a computer center 390 that implements production scheduling. The computer center 390 generally implements a plant-level controller that can execute one or more manufacturing execution system (IVIES) applications, scheduling applications, or other or additional plant or process control applications. Each of the plant-level controllers can generally include any suitable structure for providing access to, control of, or operations related to one or more process units in a process plant. The plant-level controllers can represent a server computing device running a MICROSOFT WINDOWS operating system. Access to the plant-level controllers in the computer center 390 may be provided by one or more operator stations.

Level 3 includes coordinating computers 380 or unit-level controllers for implementing production control. Each coordinating computer 380 is typically associated with a unit in a process system, which represents a collection of different processing machines operating together to implement at least part of a process. The coordinating computers 380 perform various functions to support the operation and control of components in the lower levels. The coordinating computers 380 are shown connected together by a network shown as 340 that may comprise an Ethernet network or other communications network.

Level 2 comprises a plant supervisor level that includes supervisory computers 370 also known as machine-level controllers that are coupled together by a network shown as 320. Network 320 may also comprise an Ethernet network. The supervisory computers 370 perform various functions to support the operation and control of the microcontrollers 360 (shown as μC 360 in level 1) also called direct controllers, as well as the sensors and actuators shown as field devices 302 on level 0, which can be associated with a particular piece of industrial equipment (such as a boiler or other machine).

For example, the supervisory computers 370 may log information collected or generated by the μC's 360, such as measurement data from the sensors or control signals for the actuators. The supervisor computers 370 can also execute applications that control the operation of the μC's 360, thereby controlling the operation of the actuators. In addition, the supervisor computers 370 can provide secure access to the μC's 360. Each of the supervisor computers 370 may include any suitable structure for providing access to, control of, or operations related to a machine or other individual piece of equipment. Each of the supervisor computers 370 can represent a server computing device running a MICROSOFT WINDOWS operating system.

Level 1 implements direct control and is shown comprising a plurality of μC's 360. Level 0 is the field level that includes input/output (I/O) devices 303 coupled to field devices 302 including sensors and actuators, that are coupled to the processing equipment 301.

Disclosed aspects may span multiple levels. In one arrangement the respective supervisory computer 370 nodes on level 2 participate in PB-based secured multicast communications. However, generally any group of computers, I/O devices and/or controllers that may want to create a privileged group can use disclosed PB-based secured multicast communications, including if this group wanted the ability to span across multiple levels security zones (e.g., level 1 to level 3).

Benefits of using a disclosed PB-based secured multicast communications to manage and distribute keys, policies and grant initial access for nodes to participate on a multicast network include requiring less overhead as compared to conventional server-based standard for secure multicast. The conventional requirement for a single server to manage these functions is displaced by enabling each authorized and participating node to initiate a dialogue between unauthorized nodes to allow a determination to be made for network participation.

The conventional "server" currently described in the standard network arraignments serves as a single point of failure, whereas each in this Disclosure a participating node hosting an instance of the PB strengthens the security posture of the multicast network in addition to being able to act as a redundancy to manage network access. For example, the cyber-attack surface of an IPF implementation leveraging blockchains to manage network access is significantly smaller than the conventional IPF standard of using a single server in addition to being able to leverage the non-repudiation aspects of blockchain technology.

EXAMPLES

Disclosed embodiments of the invention are further illustrated by the following specific Examples, which should not be construed as limiting the scope or content of this Disclosure in any way.

This is an example of the disclosed use of PB's and smart contracts in an IPF to enable secure multicast symmetric key distribution solution and how it can be deployed and utilized. A network specific blockchain instance is created on a known trusted node. This will create the genesis block for the PB and the trusted node will distribute copies of the PB to network participants when nodes are joined to a participating multicast group. The trusted node will need a keypair to be generated, and the private key should remain private and will be encrypted if using standard deployment practices. The public key will be used by all nodes in the multicast network to request for permission to be trusted. This key pair will be used when establishing the initial connection leveraging a transport encryption method such as Transport Layer Security (TLS), Internet Protocol Security (IPSec), or another secure point-to-point communication mechanism.

This will be done once in order to securely transmit a symmetric key and any relevant policies which will be used by all nodes performing secure multicast communication. Therefore, all nodes in the multicast network will ultimately use their own public/private keys and will need to generate and store their keys. A symmetric key will also generally be created and stored securely. This key will be distributed to participating nodes on the multicast network once accepted through a smart contract mechanism as a node that is granted network participation rights. This key will be the key that enables the nodes to encrypt and decrypt relevant multicast traffic for a given group of member nodes.

For each participating node on the multicast network, the node will request access by sending the request to the trusted node. The requesting node will initiate the creation of a smart contract and push this block onto the blockchain. This smart contract in the case of the keypair will contain the public key of the requesting node to facilitate initial secure communication.

The trusted node on receipt of a new smart contract will be alerted that it has received a request from a requesting node for trust and will then decide whether to accept or reject the smart contract. As described above, the deciding can be performed manually (e.g., by an operator) given the low frequency generally within industrial control networks that new nodes are added to a network. Once the trusted node responds to the smart contract posited by the requesting node the trust relationship result will be recorded in the PB acknowledging the results of the smart contract of either a reject decision or an accept decision.

A manual managing of the nodes able to join a secure multicast group generally entails software querying the genesis block for a trusted node address. That trusted node would be the node which an operator would use to determine whether or not a node should be allowed to participate in the group which it is requesting access to.

The decision result from the trusted node regardless of whether it was accepted or rejected will be recorded in the blockchain. A positive affirmation will enable the requesting node to participate in secure multicast network communications whereas a negative response to the requesting node can be used to generate alerts that an unexpected request for trust was solicited. A positive affirmation will also result in the exchange of symmetric keys used in secure multicast communications over an asymmetric channel used initially to distribute the symmetric key and relevant policies via a point-to-point secure mechanism such as TLS.

While various disclosed embodiments have been described above, it should be understood that they have been presented by way of example only, and not as a limitation.

Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The invention claimed is:

1. A computer-implemented method, comprising:

initiating a blockchain ledger to record network addresses of member nodes of a private communication network in a distributed ledger format, by an originating member node of the private communication network;

receiving a smart contract at the originating member node from a non-member node, wherein the smart contract includes a network address of the non-member node, and wherein the smart contract serves as a request to admit the non-member node to the private communication network;

updating the blockchain ledger, by the originating member node, to record the network address of the non-member node as a member node when the request to admit the non-member node is approved;

transmitting the blockchain ledger amongst at least the member nodes; and querying the blockchain ledger of one of the member nodes, by the respective member node, to verify that a node of interest is a member node prior to communicating with the node of interest;

wherein the smart contract further includes a cryptographic key provided to the non-member node by the originating member node; and wherein the method further comprises determining to approve the request to admit the non-member node to the private communication network based at least in part on the cryptographic key contained within the smart contract.

2. The method of claim 1, further comprising:

updating the blockchain ledger, by the originating member node, to indicate that the non-member node has been denied admission to the private communication network when the request to admit the non-member node is denied.

3. The method of claim 1, further comprising:

determining to admit the non-member node to the private communication network, by the originating member node.

4. The method of claim 1, wherein the private communication network comprises an Ethernet network.

5. The method of claim 1, wherein the private communication network is configured within a communication network of an industrial processing facility (IPF) that includes supervisory computers coupled to direct controllers coupled to input/output (I/O) devices coupled to field devices that are coupled to processing equipment controlled to implement an industrial process.

6. The method of claim 5, wherein the private communication network is implemented in a plant supervisory level of the IPF that includes the supervisory computers.

7. The method of claim 1, wherein the cryptographic key supports symmetric-key algorithms.

8. The method of claim 1, wherein the cryptographic key comprises a public key of a public/private keypair that supports asymmetric key algorithms.

9. An apparatus, comprising:

an originating member node of a private communication network configured to, initiate a blockchain ledger to record network addresses of member nodes of the private communication network in a distributed ledger format, receive a smart contract from a non-member node, wherein the smart contract includes a network address of the non-member node, and wherein the smart contract serves as a request to admit the non-member node to the private communication network, and update the blockchain ledger to record the network address of the non-member node as a member node when the request to admit the non-member node is approved;

wherein each member node is configured to transmit the blockchain ledger amongst at least the member nodes, and to query the blockchain ledger of the respective member node to verify that a node of interest is a member node prior to communicating with the node of interest;

wherein the smart contract further includes a cryptographic key provided to the non-member node by the originating member node, and wherein the originating member node is further configured to determine to admit the non-member node to the private communication network based at least in part on the cryptographic key contained within the smart contract.

10. The apparatus of claim 9, wherein the originating member node is further configured to:

update the blockchain ledger to indicate that the non-member node has been denied admission to the private communication network when the request to admit the non-member node to the private communication network is denied.

11. The apparatus of claim 9, wherein the private communication network is configured within a communication network of an industrial processing facility (IPF) that has supervisory computers coupled to direct controllers coupled to input/output (I/O) devices coupled to field devices that are coupled to processing equipment controlled to implement an industrial process.

12. The apparatus of claim 11, wherein the private communication network is implemented in a plant supervisory level of the IPF that includes the supervisory computers.

13. The apparatus of claim 9, wherein the cryptographic key supports symmetric-key algorithms.

14. The apparatus of claim 9, wherein the cryptographic key comprises a public key of a public/private keypair that supports asymmetric key algorithms.

15. A non-transitory computer readable medium encoded with a computer program that comprises instructions to cause a processor of an originating member node of a private communication network to:

initiate a blockchain ledger to record network addresses of member nodes of the private communication network in a distributed ledger format;

receive a smart contract from a non-member node, wherein the smart contract includes a network address of the non-member node, and wherein the smart contract serves as a request to admit the non-member node to the private communication network; and update the blockchain ledger to record the network address of the non-member node as a member node when the request to admit the non-member node is approved;

wherein each member node is configured to transmit the blockchain ledger amongst at least the member nodes, and to query the blockchain ledger of the respective member node to verify that a node of interest is a member node prior to communicating with the node of interest;

wherein the smart contract further includes a cryptographic key provided to the non-member node by the originating member node; and wherein the computer program further comprises instructions to cause the processor of the originating member node to determine to admit the non-member node based at least in part on the cryptographic key contained within the smart contract.

16. The non-transitory computer readable medium of claim 15, further comprising instructions to cause the processor of the originating member node to:

update the blockchain ledger to indicate that the non-member node has been denied admission to the private communication network when the request to admit the non-member node to the private communication network is denied.

17. The non-transitory computer readable medium of claim 15, wherein the private communication network is configured within a communication network of an industrial processing facility (IPF) that has supervisory computers coupled to direct controllers coupled to input/output (I/O) devices coupled to field devices that are coupled to processing equipment controlled to implement an industrial process.

* * * * *